United States Patent
Bingham

[11] 3,844,622
[45] Oct. 29, 1974

[54] FLUIDIC PUMP
[76] Inventor: Joseph P. Bingham, 2134 Lambourne Ave., Salt Lake City, Utah 84109
[22] Filed: Mar. 19, 1973
[21] Appl. No.: 342,840

[52] U.S. Cl. .................. 302/45, 302/29, 302/40, 302/53, 302/55
[51] Int. Cl. .................. B65g 53/20, B65g 53/50
[58] Field of Search .......... 302/26, 29, 31, 40, 41, 302/45, 53–55

[56] References Cited
UNITED STATES PATENTS

| | | | |
|---|---|---|---|
| 2,657,100 | 10/1953 | Weller | 302/29 |
| 3,253,865 | 5/1966 | Kanics | 302/29 |
| 3,380,780 | 4/1968 | Allen et al. | 302/26 |
| 3,604,758 | 9/1971 | Flain et al. | 302/26 X |

FOREIGN PATENTS OR APPLICATIONS

| | | | |
|---|---|---|---|
| 213,676 | 12/1968 | U.S.S.R. | 302/26 |
| 1,127,799 | 4/1962 | Germany | 302/29 |
| 1,017,218 | 1/1966 | Great Britain | 302/29 |
| 1,113,755 | 5/1968 | Great Britain | 302/29 |
| 701,876 | 1/1954 | Great Britain | 302/50 |

Primary Examiner—Richard A. Schacher
Assistant Examiner—W. Scott Carson

[57] ABSTRACT

A pump for moving dehydrated granular materials, such as potato granules, that consists of a closed chamber open at one end to receive granular material continuously flowing therein. A screen formed to pass a certain volume of air therethrough bisects the chamber to receive granular material deposited on the top thereof. A distributed pneumatic flow is introduced into the chamber below the screen to provide to the chamber a volume of air, at a certain velocity, that overcomes the force of gravity exerted on the individual granules of material, causing the granules to float off from the screen, fluidizing with the air flow therein. The pneumatic flow is exhausted from the chamber, carrying the granular materials therewith through an exhaust line leading from the chamber. The exhaust line is formed, having its greatest diameter proximate to the chamber, tapering inwardly into a lesser diameter transport tube wherein the moving granular materials pack together into plugs that are moved by the air flow exiting the chamber, through the lesser diameter transport tube, to a receiving receptacle connected thereto.

6 Claims, 5 Drawing Figures

FLUIDIC PUMP

BRIEF DESCRIPTION OF THE INVENTION

1. Field of the Invention

This invention relates to fluidic pumps that utilize an air flow for moving granular materials.

2. Prior Art

Pneumatic pumping arrangements for moving granular, powder, flake or like materials using pneumatic pressure have been known and in common use for some time. U.S. Pat. No. 2,975,000 discloses such a pneumatic system that employs a high velocity air flow for transferring fluidized solids. While the present invention utilizes an air flow for moving flake or granular materials, that air flow can be optimumly controlled to effect a low velocity transfer to avoid damaging the individual granular material particles. Some granular materials, such as potato granules, are not well suited for high velocity transfer in that a high velocity impact of the individual granules against a rigid surface may actually fracture the potato granules, causing a flavor loss thereof, whereafter such broken potato granules will form a sticky mass when mixed with water. Additionally, the individual granules, when moved rapidly within a transfer line, striking against the sides thereof, tend to have an abrasive effect on the transfer walls, actually wearing away the wall interior, necessitating periodic replacement.

The pump of the present invention has arranged as a part thereof a screen on which the granular materials are deposited and through which a distributed air flow is passed to displace the granular materials and move them through a transfer line. Screens or air permeable plates, similar to that of the present invention, are shown in U.S. Pat. Nos. 3,208,799 and 3,385,634 arranged with pumps that receive a granular product deposited thereon and direct an air flow to elevate the granular material therefrom. Like the aforesaid pump of U.S. Pat. No. 2,975,000, these pumps also utilize a high velocity air flow to move the granular materials, and all lack the inwardly tapering exhaust line of the present invention, wherein the fluidized granular materials are compacted, enabling a low velocity transfer thereof.

Other pneumatic systems for entraining granular or powder materials in an air flow are shown in U.S. Pat. Nos. 2,957,727, and 3,463,553 which patents disclose apparatus and systems that are unlike the present invention, and are included herein only as references to the state of the pneumatic conveying art.

While features such as the air permeable plate or screen of the present invention are shown in some of the art disclosed, none of the references discovered, nor does any apparatus to my knowledge, incorporate the tapered exhaust line of the present invention, whose incorporation makes possible the transfer of granular, or flake, or powder materials thorugh a transfer line using a relatively low velocity pneumatic source.

SUMMARY OF THE INVENTION

It is a principal object of the present invention to provide a fluidic pump for transferring granular, flake, powder, or like materials introduced therein through a transfer line to a storage receptacle using a relatively low velocity pneumatic source.

Another object is to provide a fluidic pump whose rate of transfer of such granular, flake, powder or like materials can be closely controlled.

Still another object is to provide a pump apparatus having minimal height dimensions whereby it can be arranged below a carrier, such as a truck, receiving the granular material directly therefrom.

Still another object is to provide a pump apparatus which is relatively simple and inexpensive to construct, having as the only moving parts associated therewith, pneumatic feed valving for introducing granular materials therein, and standard pneumatic valving for controlling the pneumatic flow therethrough.

Principal features of the present invention include a closed chamber fabricated with a screen or other like air permeable member arranged therein bisecting the chamber. The chamber is arranged having a granular material receiving portal connected to a feed arrangement for continuously supplying granular materials to the chamber, which feed arrangement, it should be assumed, incorporates control valving for passing a desired and continuous flow rate of granular materials to the chamber.

A pneumatic source arranged to supply a desired volume and velocity air flow is connected to the chamber, entering below the screen through a centered porous tube that evenly distributes the air flow thereunder. The air flow is closely controlled to just lift a desired flow rate of granular materials off from the screen, fluidizing the individual particles of granular materials with the air flow, which fluidized mass then flows from the chamber through an exhaust opening formed therein. An exhaust line that tapers inwardly from a greater diameter at its point of connection with the chamber exhaust opening, constricting to connect to a transport tube that is in turn connected at its opposite end to a receiving receptacle. Fluidized particles of granular materials flowing into the exhaust line are squeezed and packed together therein as the cross sectional area of the exhaust line decreases, forming a dense, packed plug against which the air flow from the chamber acts to drive the plug through the transport tube into the receiving receptacle.

The preferred screen of the present invention is purposely arranged to have a somewhat greater open area between the holes therein than would support a design flow rate such that a surplus amount of materials will remain piled thereon. The materials remaining thereon will, however, be constantly replaced; and, should a higher flow rate be desired, then the volume of the air flow from the pneumatic source can be adjusted accordingly to increase the flow rate. Like the screen, the transport tube connected to the exhaust line of the present invention is preferably formed having a somewhat greater diameter than is required to support the design flow rate. The pump of the present invention can therefore be operated to pass, as desired, a range of flow rates of granular materials within flow rates, limited by, respectively, the screen open area and the diameter of the transport tube. The transport tube of the present invention, by controlling the volume and velocity of the pneumatic source, can therefore pass various flow rates of different granular materials.

Additional objects and features of the present invention will become apparent from the following detailed description, taken together with the accompanying drawings.

THE DRAWINGS

In the drawings:

FIG. 1 is a side elevation view of the chamber of the invention, connected to a double hopper granular material feed arrangement that provides from a conveying vehicle, not shown, a constant flow into the fluidic pump of the invention;

FIG. 2, a front elevation view of the fluidic pump of the invention and the double hopper feed arrangement of FIG. 1;

FIG. 3, a top plan view of the fluidic pump of the invention, shown unconnected from the twin hopper feed arrangement;

FIG. 4, a front elevation view of the fluidic pump of FIG. 3; and

FIG. 5, a sectional view of the chamber interior taken along the line 5—5 of FIG. 3.

DETAILED DESCRIPTION

Figure 1:
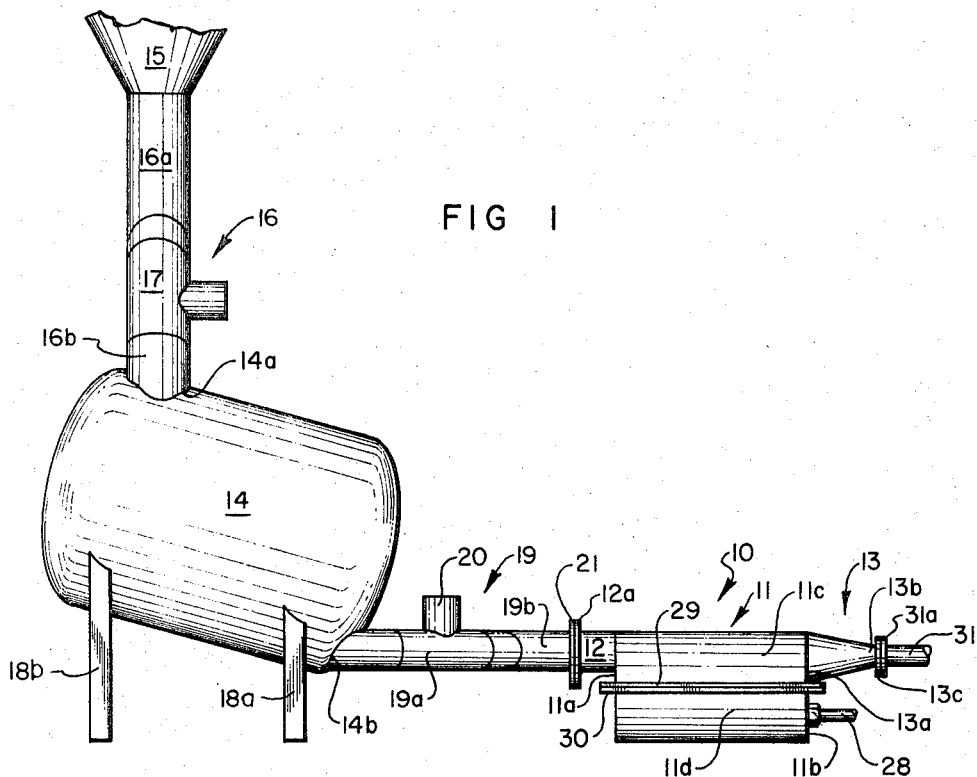

Referring now to the drawings:

A preferred embodiment of the invention in a fluidic pump 10 is shown in FIGS. 1–5. Shown therein, the fluidic pump 10 consists of a closed chamber 11 arranged with an inlet portal 12 extending from one end 11a, with an exhaust line 13 extending from an exhaust opening 11c, FIG. 5, formed through the opposite end 11b thereof.

Figure 2:
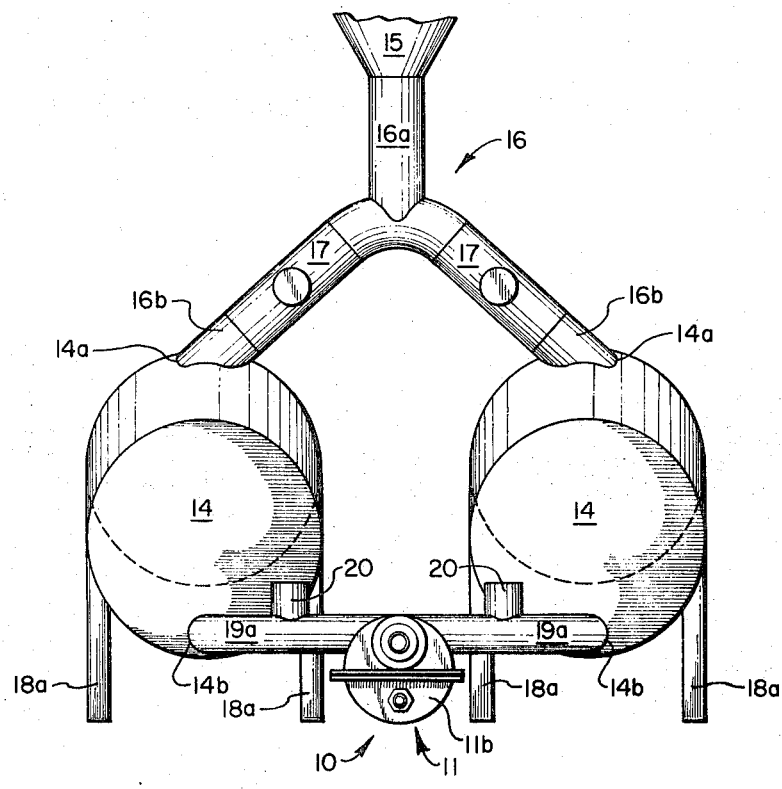

In FIGS. 1 and 2, the fluidic pump 10 is shown connected to a granular materials supply system consisting of twin vessels 14 that are each filled from a common inlet hopper 15. Granular materials introduced into hopper 15 are gravity-fed therefrom through a base leg 16a of an inverted Y-junction 16, whose connected legs 16b dump through inlet openings 14a in the tops of vessels 14. Granular materials flowing through the respective connected legs 16b are controlled by valves 17 arranged therein. In practice, butterfly valves operated selectively by electrical controls and sensors, not shown, have been used successfully as the valves 17; though, of course, other types of valves could be adapted for use with the feed arrangement herein described.

The respective vessels 14 are each arranged on unequal length support legs 18a and 18b respectively such that a discharge opening 14b in each vessel 14 will be the vessels lowest point with respect to the horizontal. Granular materials flowing into the respective vessels 14 accumulate above the discharge openings 14b to flow therefrom through connecting legs 19a of a Y-feed 19 that are secured thereto and are connected on their opposite ends to a base leg 19b. Like the inverted Y-feed 16, the Y-feed 19 has valves 20 arranged in the connecting legs 19a thereof, which valves are preferably pinch valves that selectively pass or close off granular material flow therethrough. A flange 21 is secured to extend from around the end of the Y-feed base leg 19b opposite to the connecting legs 19a, for connecting with bolts, not shown, or the like, to a flange 12a that extends parallel thereto, from around the end of the inlet portal 12 opposite to the chamber end 11a.

The preferred form of a granular material feed arrangement described herein is intended to supply a continuous flow of granular materials to the inlet portal 12 of the fluidic pump 10 of the invention. It should be apparent that, to provide such a continuous flow, the various described valves 17 and 20 should be capable of being opened and closed selectively such that the one vessel 14 will be in the process of filling while the other is discharging, and vice-versa, such that a continuous flow is provided through the inlet portal 12. Empty and filled sensor means, not shown, are therefore preferably arranged with the vessels 14 to control operation of the respective valves 17 and 20, automatically providing a constant granular material input to the fluidic pump 10 of the invention.

While a twin vessel system, related valving, and connecting Y-feed lines, having been shown herein as a preferred form of feed arrangement, obviously other granular material feed arrangements could be adapted for use with the invention. Or, the chamber inlet portal 12 could be connected, not shown, through appropriate lines directly to the inlet hopper 15.

As a number of feed arrangements are, of course, available for adaptation to the fluidic pump 10 of the present invention, the invention embodied herein should not be construed as being limited to any single type of granular feed arrangement.

Granular materials discharged into the chamber 11 through portal 12 are deposited onto an air permeable member or screen 25, shown in FIG. 5, whose function will be explained in detail later herein. The purpose of the fluid pump of the invention is, of course, to pump granular materials received therein to a receiving receptacle, not shown. To meet such a purpose, the granular materials are often required to flow upwardly against the force of gravity, and so a positive displacement force must be exerted thereagainst. The present invention employs a pneumatic source, not shown, connected, as will be described, to the chamber 11, to provide an air flow that effects the required displacement. The chamber 11 of the invention, as already disclosed herein, is connected to both an inlet portal 12 and exhaust line 13 on its opposite ends 11a and 11b, and has a porous tube 26 arranged therein, below the screen 25. The porous tube 26 is preferably formed of a plastic, and is connected on its end 26a to a coupling 27 that extends through the chamber end 11b, and is joined to a feed line 28 connected on its other end to a pneumatic source, not shown. An air flow from the pneumatic source, not shown, enters the porous tube 26 from the end 26a thereof and is discharged evenly along the tube 26 length, to flow uniformly through the screen 25 to act, as will be described later herein, upon the particles of granular material deposited thereon.

The chamber 11 is preferably formed in upper and lower cylindrical sections 11c and 11d respectively, that each have flanges 29 and 30 respectively, extending from along the edges thereof. Shown best in FIG. 5, the screen 25 is secured, around its edges, sandwiched between the flanges 29 and 30 by bolts, not shown, or like connection means, bisecting the chamber 11 formed by coupling the top and bottom halves 11c and 11d together. The particular air permeable member or screen 25 for use in a fluid pump 10 intended to move a certain granular material is selected using a mathematical formula that will be described in detail later herein, to provide a required open area therethrough, selected to pass a required volume and velocity of air therethrough to move a particular granular material at a desired flow rate.

Assuming a certain volume and velocity of air flow is evenly distributed through the porous tube 26, below the screen 25, the individual granules of material will be elevated as the air flow overcomes the force of gravity thereon. A desired amount of granular materials are thereby fluidized with the air flow, and, traveling therewith, exit the chamber 11 into the exhaust line 13.

Figure 3:
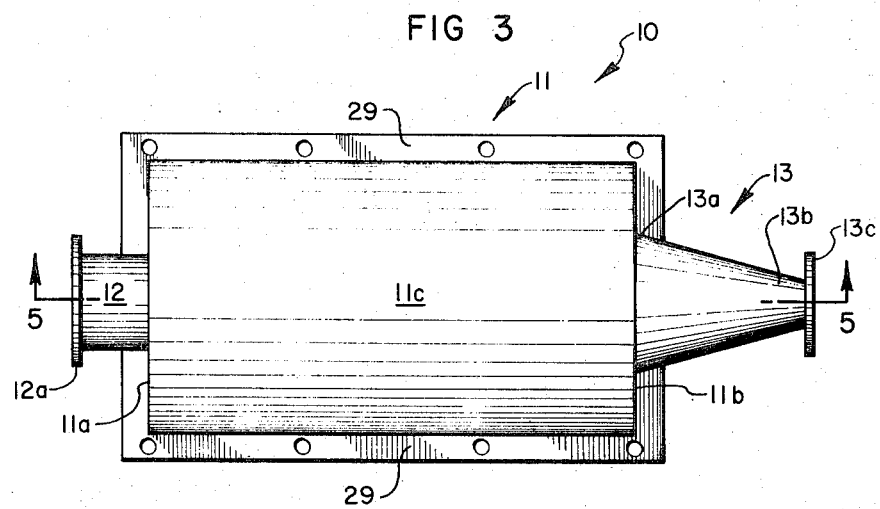
Figure 4:
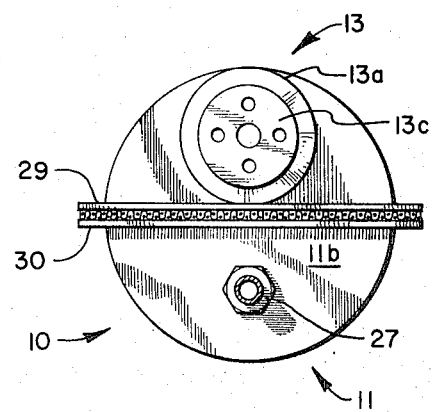
Figure 5:
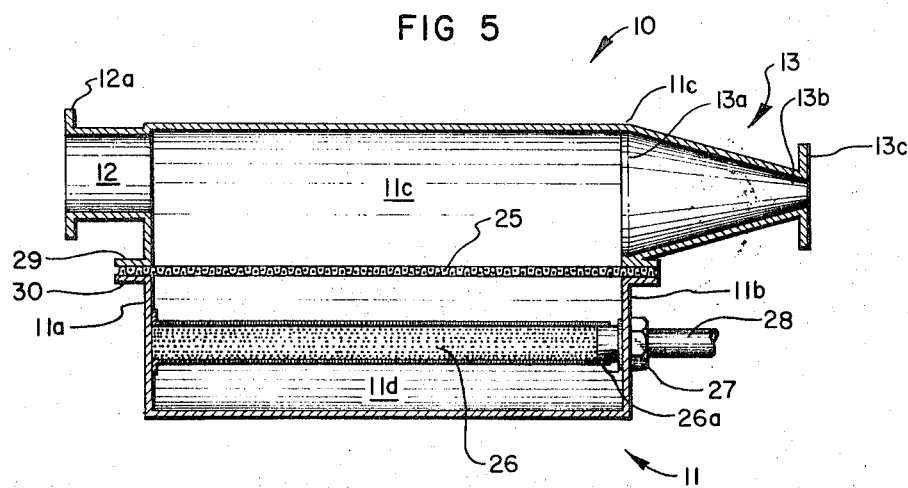

The exhaust line 13, FIGS. 1, 3, and 5, tapers inwardly from its greatest diameter at 13a, adjacent to the chamber end 11b, to a lesser diameter at 13b that corresponds to the diameter of a transport tube 31, FIG. 1. Construction of a fluidic pump 10 for moving potato granules, having a constant taper of from 7° to 20° between the largest and smallest ends respectively has been found to be an optimum range of taper for the exhaust line 13. Selection of a particular taper from that range of from 7° to 20° is dependent upon the mass of the particular material being transported and the desired flow rate of that transport.

A flange 13c is formed to extend outwardly from around the exhaust line end 13b for coupling with bolts, not shown, or the like, to a similar flange 31a, formed to extend outwardly from around the end of the transport tube 31. The transport tube 31 extends from the exhaust line 13, maintaining a constant diameter throughout its length; and is connected to, or dumps into, a storage receptacle, not shown, at its other end.

Fluidized particles of granular material, as they move with the air flow, travel into the exhaust line 13, and are forced by the narrowing passage into close proximity with one another. The particles are thereby packed together, forming plugs of packed granular materials. The air flow passing from the chamber 11 continues to act upon the formed plugs, forcing them from the exhaust line 13 and through the connected transport tube 31, exhausting the plugs from the end thereof, not shown, into a storage receptacle, not shown.

By densely packing together the individual particles of granular materials within the exhaust line 13, a non-porous surface is presented across the transport tube 31 for the air flow to act upon, such that even a relatively low velocity and volume air flow can move the plug through the transport tube 31.

By squeezing the fluidized granular materials and air, the air mixed therewith is, of course, displaced and tends to flow into fissures that naturally develop in the packed granular materials, forming pockets therein that separate individual plugs of granular material particles as the column of air and granular materials travels through the transport tube 31. Such pockets serve as air cushions within the transport tube 31, and are expelled along with the plugs of granular materials from the end of the transport tube 31 into the storage receptacle, not shown.

The fluidic pump 10 of the present invention can be constructed to move a variety of granular, flake, powder, or like materials at various flow rates. Establishing, through testing, the velocity limits within which a desired flow rate of materials can be moved without damaging individual granules or particles thereof, makes possible the construction of a fluidic pump 10 having a sufficient internal area, screen 25 area, and an optimum diameter of transport tube 31.

In practice, the fluidic pump 10 was constructed to move dehydrated potato granules. To construct this pump it was first required to determine at what velocity potato granules would be damaged upon striking the side or a bend in a transport tube. Experimentally it was calculated that an average force of approximately 18 grams or 0.0397 lbs. was required to crush a potato granule rendering it undesirable as the flavor is lost by such crushing, and the potato granule thereafter will not mix properly with water. A potato granule traveling at approximately a velocity of 64 ft/sec, when directed against a solid surface, will be subjected to the above stated fracture force. Additionally, it was determined experimentally, based on the size and density of an average potato granule, that the minimum air flow velocity for an efficient transfer is from 10 to 13 ft/sec. From this experimental data it was concluded that the potato granules could be moved efficiently at velocities of from 10 to 30 ft/sec without damage.

For purposes of this model, a continuous flow rate of 40 lb/min was selected as the design flow rate of potato granules. By measurement it was determined that the potato granules transported had a normal density of 59 lb/ft3, and assuming a fluidic mixing of potato granules and air in portions of one-third and two-thirds, then the minimal cross sectional area and diameter of the transport tube 31 can be determined using the formula:

$$\rho A V = \dot{m} \quad \text{with:}$$

$\rho$ = density of product plus air mixture in pipe, lb/ft3;

$A$ = area of pipe, ft2;

$V$ = velocity of product (converted to ft/min); and $\dot{m}$ = mass flow rate (lb/min)

Using the above formula the transport tube 31 must have an internal cross sectional area of:

$A = \dot{m}/\rho V$ or

1/3 (59 lb/ft3)/40 lb/min (60 sec/min) 10 ft/sec (lowest optimum velocity)

$A = 0.005042$ ft2 (144 in2/ft2) $= 0.726$ in2

$A = \pi r2 = 0.726$ in2 $= 3.1416$ $r2$ $r2 = 0.231$ in2 $r = 0.485$ in $d = 0.960$ in (rounded off to 1 inch as the desired size of the internal diameter of the transport tube 31)

The open area required for the screen 25 arranged within the chamber 11 is determined by an analysis of the air flow volume required to move the granular materials and the velocity of that air flow as it passes through the screen 25. In practice it was determined that the velocity of air passing uniformly through the screen 25 must be at least 2.4 ft/sec to fluidize the individual potato granules and the flow rate of air required to keep the product moving at a rate from 10 to 15 ft/sec, measured empirically is 22 ft3/min. Using a 200 mesh screen whose surface is 48% wire and 52% space, the air flow rate through the screen can be calculated by using the formula:

$$q = AV \text{ where:}$$

$q$ = air flow rate in cfm;

$A$ = area of the screen in ft2; and $V$ = velocity of air through the screen in ft/min.

Using the above formula, 22 ft3/min $= A(2.4$ ft/sec $\times 60$ sec/min$) = A(144$ ft/min$)$ $A = 22$ ft3/min/144 ft/min $= 0.1525$ ft2 $\times 144$ in2/ft2 $= 22$ in2 required area equals 22 in2 which is multiplied by the open area available through a 200 mesh screen or 1/0.52, 22 in2 $\times$ 1/0.52 $= 42.3$ in2 screen required.

Using 6 inches as the screen width dimension, the screen 25 should be approximately 7 inches in length to move a flow rate of material at 40 lb/min. A chamber 11 was therefore fabricated containing a 200 mesh screen having a 6 inch width and 10 inch length such that flow rates of 40 lb/min and higher could be transported, which higher transport rates would require only an increase in the air flow volume to effect the greater flow rate. The chamber 11, to insure the availability of an ample internal area, is formed as a cylinder having a diameter equal to the screen width, with the screen secured across the cylinder, separating the cylinder into upper and lower halves 11c and 11d.

By providing respectively a screen which is somewhat larger than the minimal size required, the pump of the invention can be made to move the particular granular material at a higher flow rate by simply increasing the air flow volume distributed in the chamber. With chamber 11 of the present invention receiving that air flow required to produce the 40 lb/min output described, some input flow or materials will remain on the screen 25. This accumulation of materials is, of course, being constantly replaced by materials entering the chamber and will not influence the output flow rate therefrom.

The system described herein in detail relates to a pump designed to move potato granules or flakes. Taking into account the design changes necessitated by the different parameters involved in moving a different material, such as powdered milk, a fluidic pump 10 can be constructed to transport efficiently any number of such granular or flake materials. As has been already recited herein, the cylinder 11 of the fluidic pump 10 of the present invention, optimumly is fabricated having as the diameter thereof the width of the screen 25. The pump of the present invention therefore presents a minimal height dimension as it does not require a column of materials standing on the screen 25 to operate properly. The fluidic pump 10 therefore is highly versitile and can actually be installed under a transport vehicle, or the like, to receive a constant flow of granular materials therefrom.

Although a preferred form of my invention has been herein disclosed, it is to be understood that the present disclosure is made by way of example and that variations are possible without departing from the subject matter coming within the scope of the following claims, which subject matter I regard as my invention.

I claim:

1. A fluidic pump comprising
means defining a closed cylindrical chamber;
an air permeable means arranged in said chamber and separating an upper semicylindrical section of said chamber from a lower semicylindrical section thereof, said permeable means provided for passing air therethrough;
a chamber inlet arranged in said chamber above said air permeable means through which chamber inlet granular materials pass onto said air permeable means;
means for supplying a flow of granular materials to said chamber inlet;
a porous tube, closed at one end, centered in the lower semicylindrical section of the chamber below said air permeable means, and extending the length of said air permeable means for distributing an air flow in said chamber;
a pneumatic source connected to the other end of said porous tube;
a chamber exhaust opening arranged in said chamber above said air permeable means opposite to said chamber inlet;
an inwardly tapering exhaust line connected at its widest end to said chamber exhaust opening and tapering inwardly to a lesser diameter at its other end, said exhaust line receiving a fluidized flow of a mixture of air and granular materials therein; and a transport tube means connected on one end to the smaller diameter end of said exhaust line means for passing the consolidated granular materials therethrough.

2. A fluidic pump as recited in claim 1, wherein the air permeable means arranged in said chamber consists of a 200 mesh screen.

3. A fluidic pump as recited in claim 1, wherein the porous tube is constructed of a porous plastic.

4. A fluidic pump as recited in claim 1, wherein the taper of the exhaust line is selected from a range of angles of from 7° to 20°.

5. A fluidic pump as recited in claim 1, wherein said supplying means comprises
first and second vessels each having an inlet opening and a discharge opening, with the inlet openings positioned at the top of the respective vessels and the discharge openings positioned at the lowest point thereof;
a common inlet hopper;
first and second feed legs for delivering granular materials from said hopper to the inlet openings of said first and second vessels respectively;
first and second discharge legs for delivering granular materials from the discharge openings of said first and second vessels respectively to said chamber inlet;
first and second valve means disposed in said first and second feed legs respectively for controlling the flow of granular material in the respective leg; and third and fourth valve means disposed in said first and second discharge legs respectively for controlling the flow of granular material in the respective leg.

6. A fluidic pump as recited in claim 1, wherein said chamber defining means includes an upper semicylindrical portion and a lower semicylindrical portion, each portion including a flange extending from along the edge thereof so as to mate with the flange of the other portion when the two portions are placed together; and
said air permeable means is secured by its edges between the flanges of said semicylindrical portions.

* * * * *